(12) United States Patent
Numano et al.

(10) Patent No.: US 8,078,239 B2
(45) Date of Patent: Dec. 13, 2011

(54) MOBILE PHONE WITH A PLURALITY OF SPEAKERS

(75) Inventors: Yasuhisa Numano, Kanagawa-Ken (JP); Kenji Satake, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 541 days.

(21) Appl. No.: 12/234,883

(22) Filed: Sep. 22, 2008

(65) Prior Publication Data

US 2009/0088222 A1    Apr. 2, 2009

(30) Foreign Application Priority Data

Sep. 28, 2007   (JP) ................................ P2007-255617

(51) Int. Cl.
*H04M 1/00*    (2006.01)

(52) U.S. Cl. ............... 455/575.4; 455/575.1; 455/575.3; 455/569.1; 379/433.02; 379/433.12; 379/433.13; 379/420

(58) Field of Classification Search ............... 455/575.1, 455/569.1, 575.3, 575.4; 379/433.02, 433.12, 379/433.13, 420

See application file for complete search history.

(56) References Cited

U.S. PATENT DOCUMENTS

| 6,359,984 B1 * | 3/2002 | Kim ......................... 379/433.02 |
| 6,751,446 B1 * | 6/2004 | Kim et al. .................... 455/90.1 |
| 2009/0017878 A1 * | 1/2009 | Romesburg et al. .......... 455/570 |

FOREIGN PATENT DOCUMENTS

| JP | 2003-18267 A | 1/2003 |
| JP | 2003-87379 A | 3/2003 |
| JP | 2003-198715 A | 7/2003 |
| JP | 2005-142834 A | 6/2005 |

OTHER PUBLICATIONS

Japanese Office Action dated Apr. 21, 2009 (2 pages), issued in counterpart Japanese Application Serial No. 2007-255617.

* cited by examiner

*Primary Examiner* — Dwayne Bost
*Assistant Examiner* — Amancio Gonzalez
(74) *Attorney, Agent, or Firm* — Maschoff Gilmore & Israelsen

(57) ABSTRACT

A mobile phone includes a microphone and a plurality of speakers, the mobile phone changes its configuration state into at least two states, a closed state in which the microphone is covered, and an open state in which the microphone is not covered. The mobile phone further includes a determination unit configured to determine the configuration state; and an output control unit configured to, on the basis of the determination result by the determination unit, control on/off action of the plurality of speakers and the microphone.

12 Claims, 7 Drawing Sheets

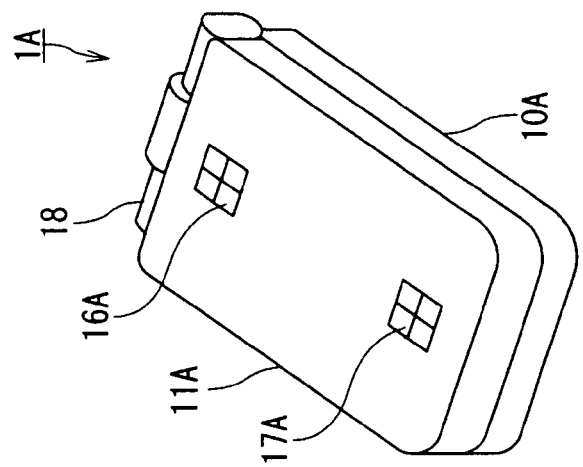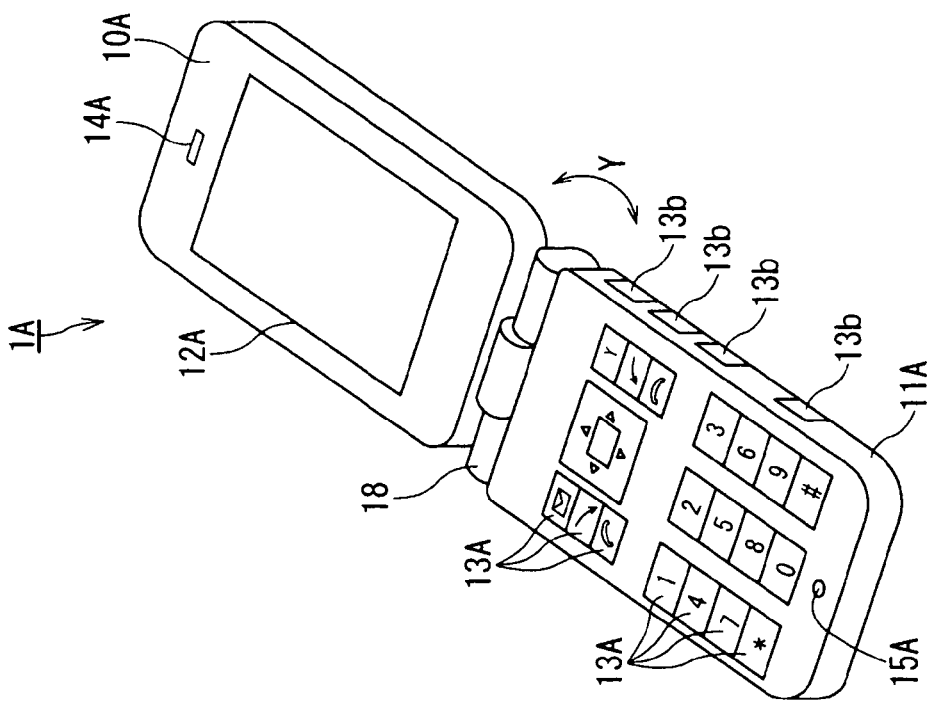

MOBILE PHONE WITH A PLURALITY OF SPEAKERS

BACKGROUND OF THE INVENTION

1. Field of the Invention

The present invention relates to a mobile phone, and more specifically, to a mobile phone that is capable of change its configuration state into at least two states, a closed state in which a microphone is covered with the casings and an open state in which the microphone is not covered with the casings, and that is capable of performing output control of speakers in accordance with a configuration state.

2. Description of the Related Art

Recently, as compact electronic devices become more sophisticated in functionality, the mobile phone has been openably/closably constructed by, for example, foldably or slidably stacking together a plurality of casings. As a result, the mobile phone is compactly accommodated in a closed state thereof during non-usage, while it is functionally used in an open state thereof during usage. However, when the mobile phone is openably/closably constructed, a microphone incorporated in a casing is covered with another casing, so that there has been a problem in that sound waves emitted from a speaker with the casings closed, is undesirably taken into the microphone.

With this being the situation, mobile phones are disclosed that prevent sound waves emitted from a speaker from propagating to a microphone, and one example of the disclosures is Japanese Unexamined Patent Application Publication No. 2005-142834. This type of mobile phone is a foldable mobile phone comprising a body cabinet having a microphone and a lid cabinet having speakers, the two cabinets being openably/closably connected. The lid cabinet has sound radiating holes formed inside it, and incorporates a shutter for closing the sound radiating holes. This mobile phone is configured so as to open the shutter with the cabinets opened, and close the shutter with the cabinets closed, thereby preventing sound waves from propagating to the microphone.

Currently, with the increased tendency of the mobile phone toward multimedia functionality, mobile phones having speakers such as stereo speakers provided at a plurality of places of the casing are on the increase. In such mobile phones, the speakers and the microphone are often forced to be closely located within the casings. In such mobile phones, when a video-phone call or handsfree talking is made, unwanted sounds from the speakers are undesirably inputted into the microphone, and therefore, these unwanted sounds are cancelled out using an echo canceller or the like.

On the other hand, casings with an opening/closing mechanism (such as foldable type, slide type, swivel type) mostly have a construction in which a microphone is covered with the casings closed. When making a video-phone call or handsfree talking with the casings having an opening/closing mechanism closed, unwanted sounds from speakers reflect on the casing covering the microphone, so that the sounds are inputted into the microphone at a sound volume level higher than that in the case where the casings are opened. As a result, the sound volume level of the unwanted sounds from the speakers exceeds the level up to which the sound volume can be removed. This causes a problem of reducing the sound quality or causing howling on a talking partner side.

SUMMARY OF THE INVENTION

Accordingly, it is an object of the present invention to provide a mobile phone capable of preventing an occurrence of howling and maintaining a high communication quality when making a video-phone call or handsfree talking, in a mobile phone constructed by casings having an openable/closable mechanism.

To solve the above-described problem, the mobile phone according to the present invention includes a microphone and a plurality of speakers, the mobile phone changing its configuration state into at least two states, a closed state in which the microphone is covered, and an open state in which the microphone is not covered. The mobile phone further includes a determination unit configured to determine the configuration state; and an output control unit for, when the mobile phone is determined to be in the open state by the determination unit, turn on the plurality of speakers and turn on the microphone, and, when the mobile phone is determined to be in the closed state by the determination unit, turn on some of the plurality of speakers while turning off the rest thereof, and turn on the microphone.

According to the mobile phone of the present invention, in the mobile phone constructed by the casings having an opening/closing mechanism, when a video-phone call or handsfree talking is made, by controlling the speaker output in accordance with an opening/closing state of the casings, it is possible to prevent an occurrence of howling and maintain a high communication quality.

BRIEF DESCRIPTION OF THE DRAWINGS

FIGS. 10A and 10B are perspective views of a mobile phone according to a second embodiment of the present invention, wherein FIGS. 10A and 10B, respectively, show an open state and a closed state of the mobile phone.

DESCRIPTION OF THE PREFERRED EMBODIMENTS

First Embodiment

A mobile phone according to a first embodiment of the present invention will be described with reference to appended drawings. As a mobile phone 1 according to the first embodiment, a mobile phone having a construction such that a plurality of casings is slidably stacked together will be taken as an example. The mobile phone 1 is configured so as to change its configuration state into at least two states, an open state and a closed state by sliding casings with respect to each other.

Figure 1B:
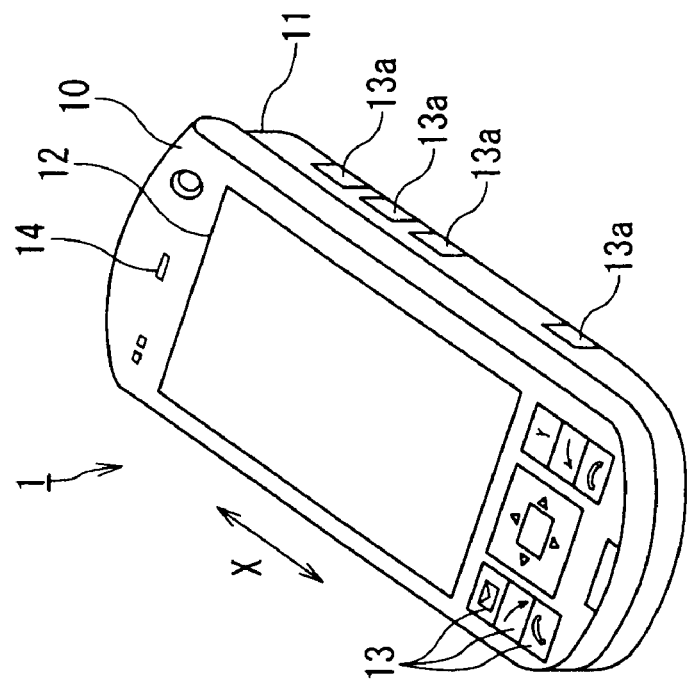
FIGS. 1A and 1B are perspective views of a mobile phone according to a first embodiment of the present invention, wherein FIGS. 1A and 1B, respectively, show an open state and a closed state of the mobile phone.
Figure 1A:
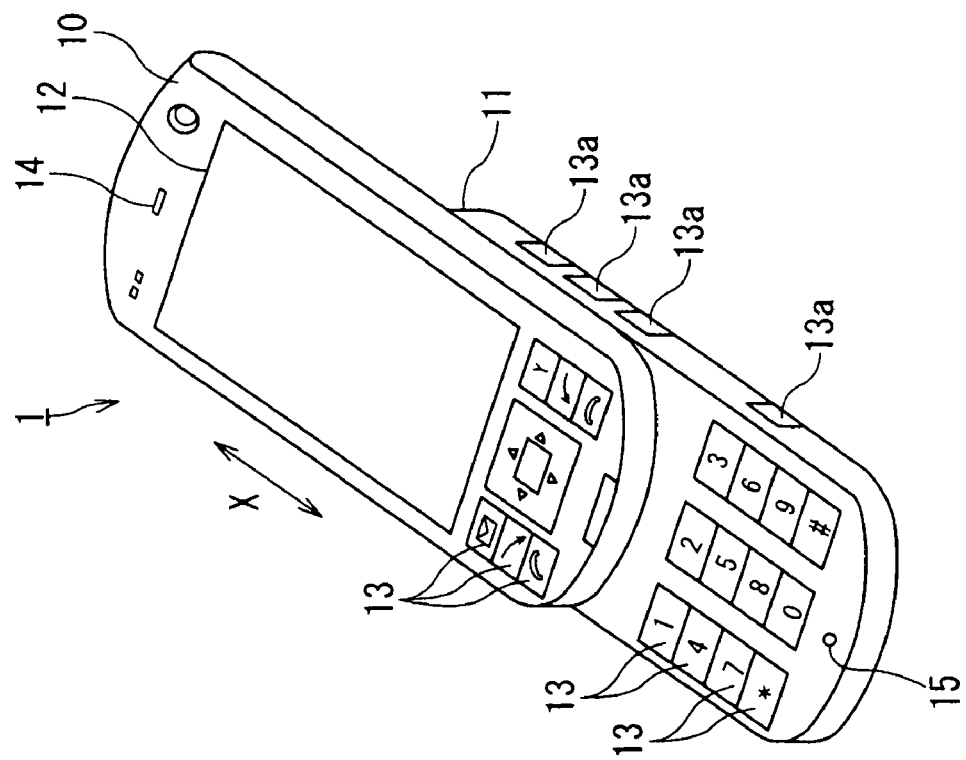
Figure 2A:
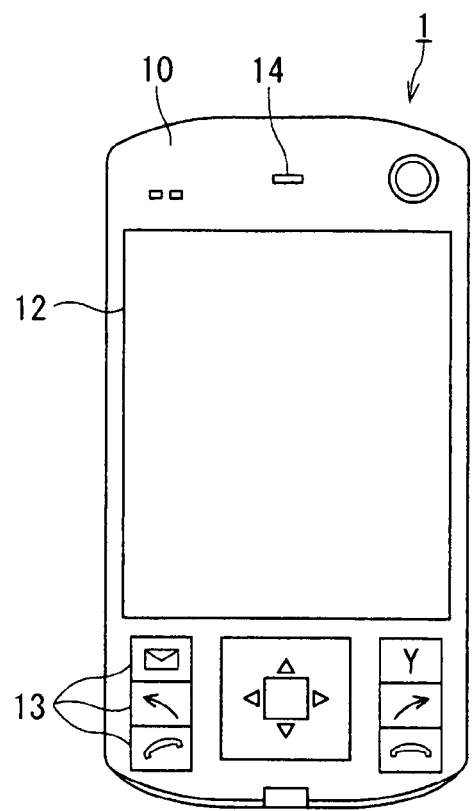
FIGS. 2A is a front view showing a closed state of the mobile phone according to the first embodiment of the present invention.
Figure 2B:
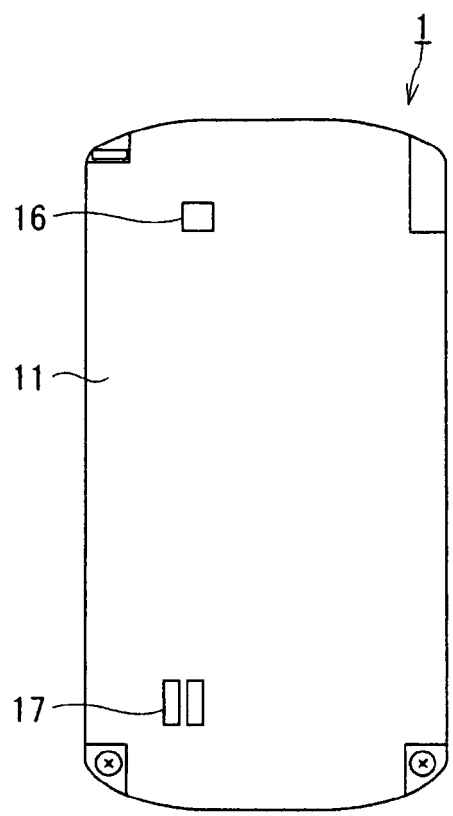
FIG. 2B is a rear view thereof.

FIGS. 1A and 1B; and FIGS. 2A and 2B show a mobile phone 1 according to the first embodiment, used as an example of mobile phone 1. Here, FIGS. 1A and 1B are perspective views, respectively, showing an open state and a closed state of the mobile phone 1. FIGS. 2A and 2B, respectively, are a front view and a rear view showing a closed state of the mobile phone 1.

As shown in FIGS. 1A and 1B, and FIGS. 2A and 2B, the mobile phone 1 is constituted by stacking together an upper casing 10 having a rectangular parallelepiped plate shape, and a lower casing 11 having substantially the same shape as that of the upper casing 10 in a way such that each of the casings 10 and 11 covers one surface of respective one of the opposed casings. The upper casing 10 and the lower casing 11 are stacked together so as to be mutually slidable in a longitudinal direction (i.e., in the X direction shown in FIG. 1A). That is, regarding the mobile phone 1, in a state where the upper casing 10 and the lower casing 11 are superimposed on each other in a way such that each of the casings 10 and 11 substantially entirely cover up one surface of a respective one of the opposed casings (i.e., the closed state shown in FIG. 1B), by sliding the upper casing 10 relative to the lower casing 11 in the longitudinal direction, the mobile phone 1 changes its configuration state into a state where the upper casing 10 overlaps the lower casing 11 with their positions displaced from each other in the longitudinal direction (i.e., the open state shown in FIG. 1A).

On the external surface of the upper casing 10 (i.e., on the surface not facing the lower casing 11), there is provided a liquid crystal display 12. The external surface of the upper casing 10 also includes operation keys 13 such as up/down/left/right keys for moving the position of a cursor in upper/down and left/right directions, and a first speaker 14 for outputting sounds. These liquid crystal display 12, operation keys 13, and first speaker 14 are disposed at positions that are always exposed to the outside irrespective of whether the mobile phone 1 is in the open state or the closed state.

The lower casing 11 has operation keys 13 such as numeric keys for inputting numerals. As shown in FIG. 1B, when the mobile phone 1 is in the closed state, these operation keys 13 are covered with the upper casing 10 and are not exposed to the outside, but as shown in FIG. 1A, when the configuration state of the mobile phone 1 is changed into the open state by sliding the upper casing 10 relative to the lower casing 11, the operation keys 13 become exposed to the outside.

Besides, the lower casing 11 incorporates a microphone 15, by which voices of a user during a phone call or a video-phone call are collected. As shown in FIG. 1B, when the mobile phone 1 is in the closed state, the microphone 15 is covered with the upper casing 10 and is not exposed to the outside, but, as shown in FIG. 1A, when the configuration state of the mobile phone 1 is changed into the open state by sliding the upper casing 10 relative to the lower casing 11, the microphone 15 becomes exposed to the outside. On a side surface of the lower casing 11, there are provided side keys 13a. By depressing one of the side keys 13a, the user can promptly actuate a predetermined function that is previously related to the side key 13a.

The lower casing 11 has a second speaker 16, and also has a third speaker 17 located a smaller distance away from the microphone 15 than the second speaker 16. The second speaker 16 and the third speaker 17 are disposed at positions from which sound waves are radiated toward the outside of the mobile phone 1. For example, radiation holes for sound waves are formed in the external surface of the lower casing 11 (i.e., in the surface in no contact with the upper casing 10), whereby sound waves are radiated toward the outside of the mobile phone 1. Here, the second speaker 16 and the third speaker 17 are provided at positions that are always exposed to the outside, irrespective of whether the mobile phone 1 is in the open state or in the closed state.

In the mobile phone 1, by sliding the upper casing 10 and the lower casing 11 with respect to each other, the microphone 15 and the first speaker 14 become exposed at predetermined positions, thereby improving the operability when the user makes voice communications using the mobile phone 1.

Figure 3:
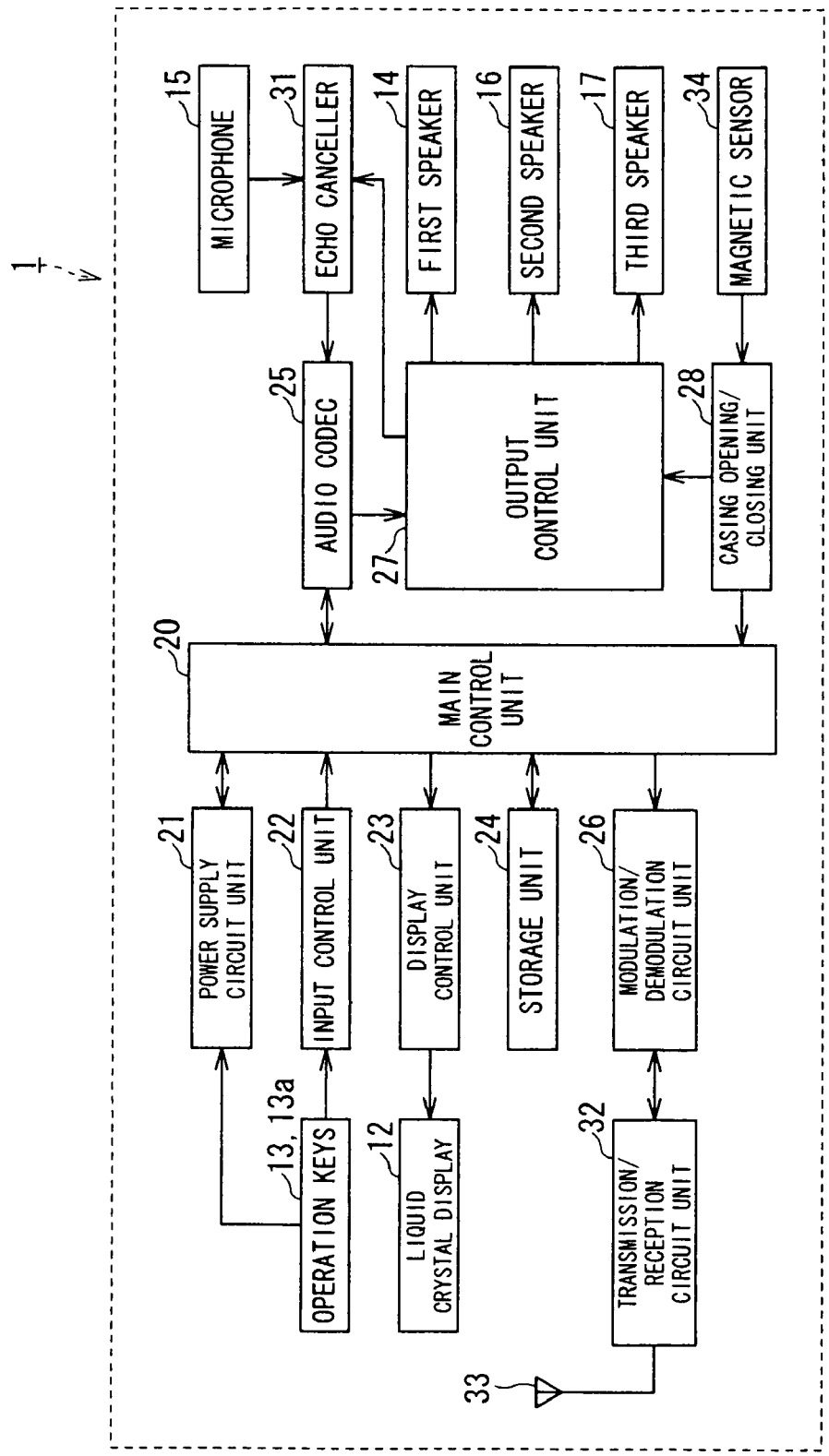
FIG. 3 is a function block diagram of a mobile phone according to the present invention.

Next, functions of the mobile phone 1 will be described. FIG. 3 is a function block diagram of the mobile phone 1. As shown in FIG. 3, the mobile phone 1 is constructed by mutually electrically connecting, by buses, a main control unit 20, a power supply circuit unit 21, an operation input control unit 22, a display control unit 23, a storage unit 24, an audio codec 25, a modulation/demodulation circuit unit 26, an output control unit 27, and a casing opening/closing unit 28.

The main control unit 20 has a central processing unit (CPU), and exercises centralized control of the mobile phone 1, as well as performs various processing such as calculation processing and control processing. The power supply circuit unit 21 switches the on/off state of a power source based on an input by the user via the operation keys 13, and when the power source is in an on-state, it supplies power to each unit from a power supply source (battery or the like) incorporated in the mobile phone 1, or from a power supply source connected to the outside, thereby making the mobile phone 1 operable.

The operation input control unit 22 has input interfaces for the operation keys 13 and the side keys 13a, and transmits data inputted by the operation keys 13 or the side keys 13a to the main control unit 20. The display control unit 23 has a display interface for the liquid crystal display 12, and under the control of the main control unit 20, it displays various data, such as character data inputted via the operation keys 13, or image data picked up by a CCD camera, to the liquid crystal display 12.

The storage unit 24 comprises storage devices such as a read only memory (ROM) for storing processing programs for processing performed by the main control unit 20 or data necessary for the processing, a hard disk, a nonvolatile memory, a random access memory (RAM) for temporarily storing data used when the main control unit 20 performs processing. Meanwhile, the processing programs and the data used when the output control unit 27 performs output control are adapted to be stored in the storage unit 24.

The mobile phone 1 performs voice communication processing with respect to other mobile phones or fixed-line phones via a base station (not shown). That is, the audio codec 25, under the control of the main control unit 20, acquires sounds collected by the microphone 15 via an echo canceller 31, and converts analog signals of these sounds into digital signals, to thereby transmit them to the modulation/demodulation circuit unit 26. The modulation/demodulation circuit unit 26 subjects these digital signals to spectrum diffusion processing, and transmits them to the transmission/reception circuit unit 32. The transmission/reception circuit unit 32 transmits these digital signals to the base station via an antenna 33.

The modulation/demodulation circuit unit 26 subjects the digital signals received by the transmission/reception circuit unit 32 from the base station via the antenna 33, to spectrum inverse diffusion processing, and transmits them to the audio codec 25 to thereby convert them into analog signals. During voice communications, the audio codec 25 converts the digital signals acquired from the modulation/demodulation circuit unit 26 into analog signals, and transmits them to the output control unit 27.

The output control unit 27, upon inputting the voice analog signals from the audio codec 25, causes the speakers such as the first speaker 14, the second speaker 16, and the third speaker 17 to output these voices. At this time, in accordance with an open/closed state of the upper casing 10 and the lower casing 11, the output control unit 27 performs output control processing with respect to the first speaker 14, the second speaker 16, and the third speaker 17. Specifically, the output control unit 27, upon receiving, from the casing opening/closing unit 28, an opening/closing detection signal indicative of an opening/closing state of the upper casing 10 and the lower casing 11, transmits, to the first speaker 14, the second speaker 16, and the third speaker 17, on/off signals for switching the on/off states of the sound sources of the respective speakers or for changing the respective sound volume levels, on the basis of the above-described opening/closing detection signal.

Furthermore, the output control unit 27, when causing the first speaker 14, the second speaker 16, and the third speaker 17 to perform sound outputs, instructs the echo canceller 31 to prevent these voice outputs from being inputted into the microphone 15. The echo canceller 31 is a device that prevents sound waves outputted from speakers such as the first speaker 14, the second speaker 16, and the third speaker 17 from being reflected (echoed) by some object (e.g., the user) to thereby be inputted into the microphone 15, that is, the echo canceller 31 a device for cancelling out unwanted voices and correcting the voice outputs.

The casing opening/closing unit 28 detects an open/closed state (configuration state) of the upper casing 10 and the lower casing 11 by a magnetic sensor 34 for example, and transmits the opening/closing detection signal indicative of an opening/closing state of the upper casing 10 and the lower casing 11, to the main control unit 20 or the output control unit 27.

Figure 4:
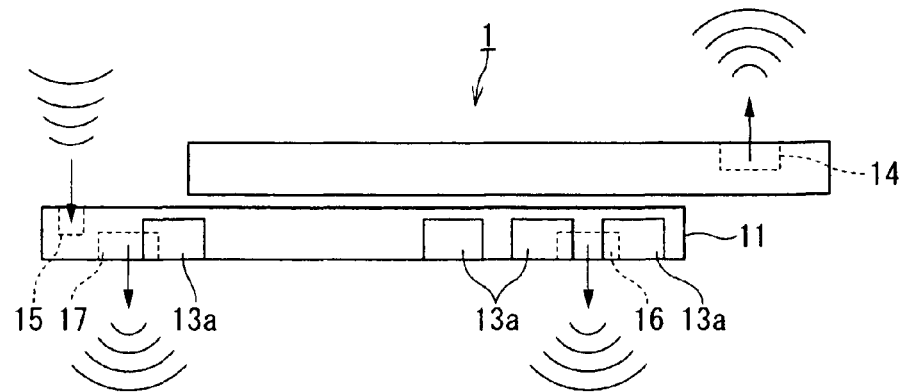
FIG. 4 is a diagram explaining output control processing of the mobile phone in an open state, according to the present invention.

When the mobile phone 1 is in the open state, as shown in FIG. 4, the upper casing 10 overlaps the lower casing 11 with their positions displaced from each other, and the microphone 15 is exposed to the outside. Here, the echo canceller 31 prevents sounds outputted by a speaker such as the first speaker 14, the second speaker 16, or the third speaker 17 from being inputted into the microphone 15.

Figure 5:
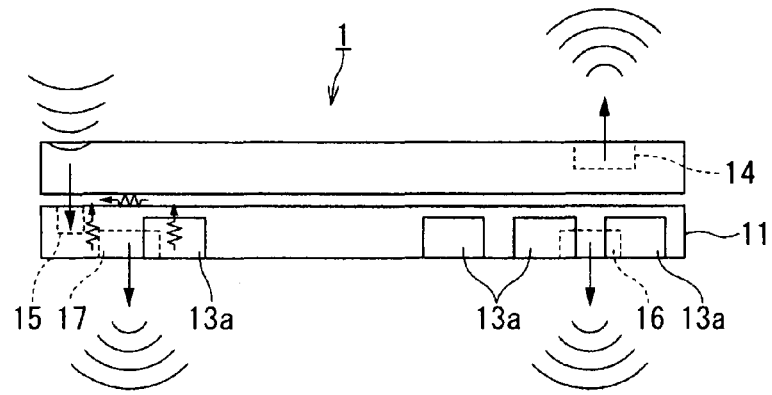
FIG. 5 is a diagram explaining output control processing of the mobile phone in a closed state, according to the present invention.

However, when the mobile phone 1 is in the closed state, as shown in FIG. 5, the microphone 15 provided in the lower casing 11 is covered with the upper casing 10, and the microphone 15 is not exposed to the outside. Here, the mobile phone 1 is configured so that the echo canceller 31 prevents sounds outputted by a speaker such as the first speaker 14, the second speaker 16, or the third speaker 17 from being inputted into the microphone 15, but there is possibility that sound waves that have leaked from spacings between devices in between the upper casing 10 and the lower casing 11 may reflect on the upper casing 10 or the lower casing 11 to thereby be inputted into the microphone 15. In this case, the sound volume level of unwanted sounds from the speaker may exceed the level up to which the sound volume can be removed by the echo canceller 31. This causes a problem of reducing the sound quality or causing howling on a talking partner side (howling: oscillation phenomenon occurring due to the feedback of some of outputs of the speaker, to the microphone 15).

Figure 6:
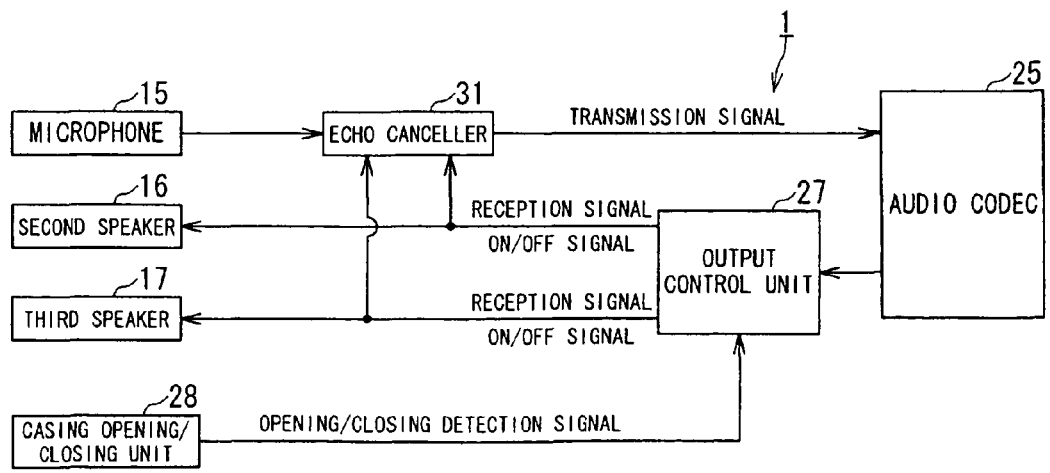
FIG. 6 is a diagram explaining output control processing of the mobile phone according to the present invention.

Such being the case, the mobile phone 1 must perform output control with respect to the speakers in accordance with an opening/closing state of the upper casing 10 and the lower casing 11. As shown in FIG. 6, the output control unit 27, when outputs sounds (e.g., reception signals) from a speaker such as the second speaker 16 or the third speaker 17, instructs the echo canceller 31 to prevent the outputted sounds from being inputted into the microphone 15. Based on this instruction, when transmitting sounds (e.g., transmission signals) inputted by the microphone 15 to the audio codec 25, the echo canceller 31 transmits them to the audio codec 25 after having removed sounds (e.g., reception signals) that have been outputted from the speaker.

Here, the output control unit 27, when outputting sounds (e.g., reception signals) from a speaker such as the second speaker 16 or the third speaker 17, acquires an opening/closing detection signal indicative of an opening/closing state of the mobile phone 1, from the casing opening/closing unit 28. In response to the opening/closing state, the output control unit 27 transmits an on/off signal to the second speaker 16 and the third speaker 17, whereby the output control unit 27 performs output control processing for switching the on/off state of the sound source of a speaker such as the second speaker 16 or the third speaker 17, or for changing the sound volume level.

Figure 7:
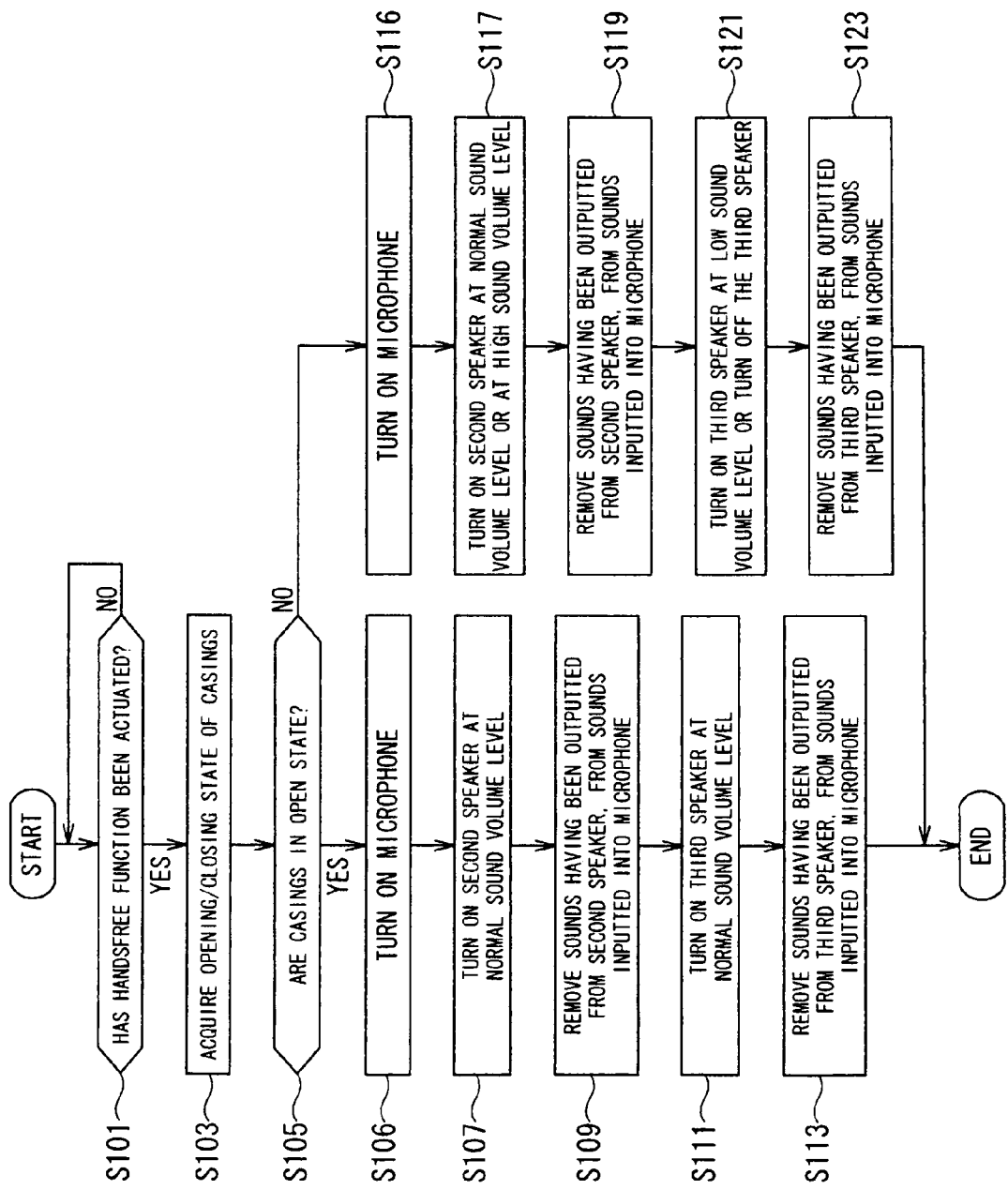
FIG. 7 is a flowchart showing procedures for output control processing of the mobile phone according to the present invention.

When the user employs e.g., handsfree function or videophone function, using the mobile phone 1, it is supposed that the user will make voice communications with the mobile phone 1 being in the closed state. As described above, when the microphone 15, the second speaker 16, and the third speaker 17 are used with the mobile phone 1 being in the closed state, the mobile phone 1 must perform output control processing with respect to the speakers. The procedures for the mobile phone 1 to perform this output control processing will be described based on a flowchart shown in FIG. 7. Hereinafter, for example, words "step S101" is abbreviated as a word "S101".

First, the output control unit 27 determines whether a handsfree function or the like has been actuated (S101). If the handsfree function or the like has not been actuated ("No" determination in S101), the output control unit 27 stands by until an instruction for the actuation is provided.

If the handsfree function or the like has been actuated ("Yes" determination in S101), the output control unit 27 transmits, from the casing opening/closing unit 28, an opening/closing detection signal indicative of an opening/closing state of the mobile phone 1 (S103). In this case, the casing opening/closing unit 28 detects the opening/closing state of the mobile phone 1, using the magnetic sensor 34 for example. If the mobile phone 1 is in the open state, the casing opening/closing unit 28 transmits, to the output control unit 27, an opening/closing detection signal indicative of the open state of the mobile phone 1, while if the mobile phone 1 is in the closed state, the casing opening/closing unit 28 transmits thereto an opening/closing detection signal indicative of the closed state of the mobile phone 1.

Figure 8:
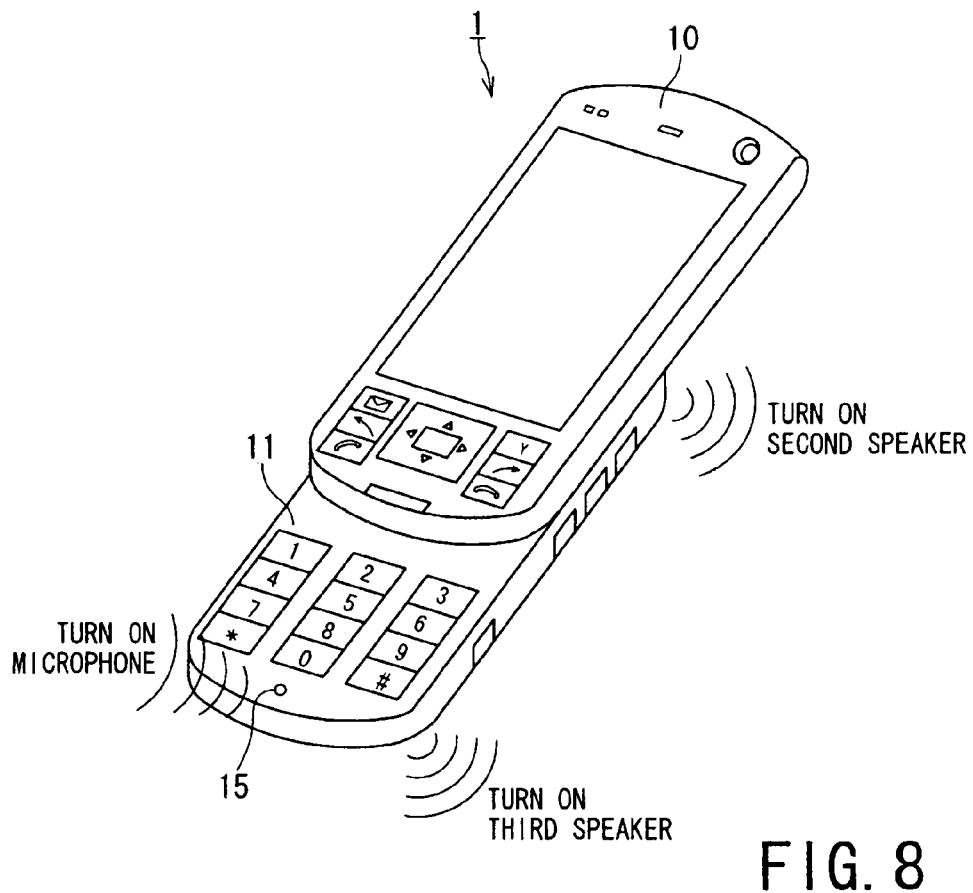
FIG. 8 is a diagram showing operations of speakers and a microphone when output control processing is performed in the mobile phone in an open state, according to the present invention.

On the basis of the opening/closing detection signal acquired in S103, the output control unit 27 determines whether the mobile phone 1 is in the open state (S105). If the mobile phone 1 is in the open state ("Yes" determination in S105), the main control unit 20 turns on the microphone 15 (S106). As shown in FIG. 8, the output control unit 27 transmits, to the second speaker 16, an on/off signal for turning on its sound source at a normal sound volume level (predetermined sound volume level) (S107). The term "normal sound volume level" here refers to, for example, a specific sound volume level that has been designated in advance, or a sound volume level that is set at that time. The output control unit 27 also instructs the echo canceller 31 to remove sounds having been outputted from the second speaker 16, from sounds inputted into the microphone 15 (S109).

Then, the output control unit 27 transmits, to the third speaker 17, an on/off signal for turning on its sound source at a normal sound volume level (predetermined sound volume level) (S111). The normal sound volume level here is, as in the case of the processing in S107, for example, a specific sound volume level that has been designated in advance, or a sound volume level that is set at that time. The output control unit 27 also instructs the echo canceller 31 to remove sounds having been outputted from the second speaker 16, from sounds inputted into the microphone 15 (S113).

In this manner, when the mobile phone 1 is in the open state, the output control unit 27 turns on, at a normal sound volume level, each of the second speaker 16 located a larger distance away from the microphone 15 and the third speaker 17 located a smaller distance away therefrom.

Figure 9:
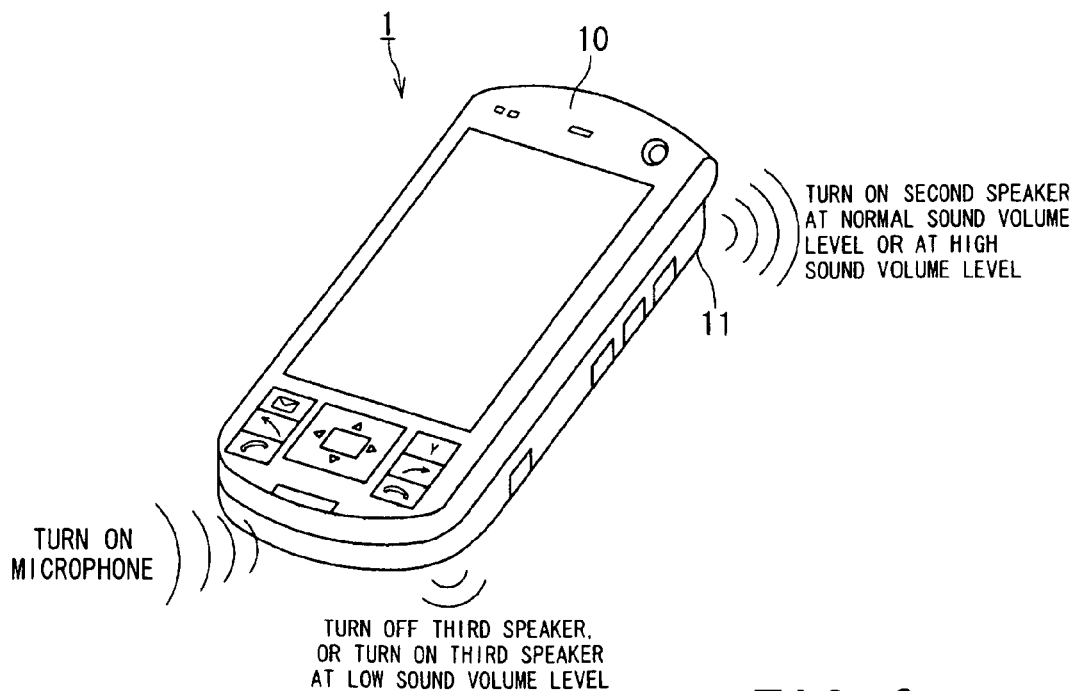
FIG. 9 is a diagram showing operations of the speakers and the microphone when output control processing is performed in the mobile phone in a closed state, according to the present invention.

On the other hand, when the mobile phone 1 is in the closed state ("No" determination in S105), the main control unit 20 turns on the microphone 15 (S116). As shown in FIG. 9, the output control unit 27 transmits, to the second speaker 16, an on/off signal for turning on its sound source at a normal sound volume level (predetermined sound volume level), or an on/off signal for turning on its sound source at a high sound volume level (S117). The normal sound volume level here is, as in the case of the processing in S107, for example, a specific sound volume level that has been designated in advance, or a sound volume level that is set at that time. The high sound volume level here is one higher than the normal sound volume level (the sound volume level that has been set in S107). When turning on the speaker at the high sound volume level, the main control unit 20 turns on the sound source at a sound volume level that has been designated in advance (a sound volume level higher than the normal sound volume level), or turning on the sound source, with the sound volume level that has been set at that time being raised. The output control unit 27 also instructs the echo canceller 31 to remove sounds having been outputted from the second speaker 16, from sounds inputted into the microphone 15 (S119).

Then, the output control unit 27 transmits, to the third speaker 17 located the smaller distance away from the microphone 15, an on/off signal for turning on a sound source at a low sound volume level, or an on/off signal for turning off the sound source of the third speaker 17 (S121). The low sound volume level here has only to be a level lower than the normal sound volume level (the sound volume level that has been set in S111). When turning on the sound source at a low sound volume level, the main control unit 20 turns on the sound source at a sound volume level that has been designated in advance (a sound volume level lower than the normal sound volume level), or turning on the sound source, with the sound volume level having been set at that time being lowered. The output control unit 27 also instructs the echo canceller 31 to remove sounds having been outputted from the second speaker 16, from sounds inputted into the microphone 15 (S123).

As described above, when the mobile phone 1 is in the closed state, the output control unit 27 turns on the sound source of the second speaker 16 located the larger distance away from the microphone 15 at the normal sound volume level or with the sound volume level raised, while the output control unit 27 turns off the sound source of the third speaker 17 located the smaller distance away from the microphone 15, or turns on the sound source of the third speaker 17 with the sound volume level lowered.

That is, by switching the on/off states of the sound sources of the second speaker 16 and the third speaker 17, or by adjusting their sound volume levels, the output control unit 27 adjusts the output sound volume level to a sound volume level within which unwanted sound volume from speakers can be removed by the echo canceller 31, even when making a video-phone call or handsfree communications with the mobile phone 1 being in the closed state.

In accordance with the mobile phone 1 according to the first embodiment of the present invention, in the mobile phone 1 constructed by casings having an opening/closing mechanism, when a video-phone call or handsfree talking is made, by controlling the speaker output in accordance with an opening/closing state of the casing, it is possible to prevent an occurrence of howling, which has been a conventional problem, and to maintain a high communication quality.

Second Embodiment

A mobile phone according to a second embodiment of the present invention will be described with reference to FIGS. 10A and 10B. In this second embodiment, the same parts as those in the first embodiment are designated by the same symbols, and redundancy is herein omitted. The mobile phone 1A according to the second embodiment is one in which a plurality of casings is mutually rotatably stacked together. The mobile phone 1A is configured so as to change its configuration state into at least two states, an open state and a closed state by rotating the casings with respect to each other. FIGS. 10A and 10B are perspective views respectively showing an open state and a closed state of the mobile phone 1A.

As shown in FIGS. 10A and 10B, the mobile phone 1A is constructed by stacking together an upper casing 10A having a rectangular parallelepiped plate shape, and a lower casing 11A having substantially the same shape as that of the upper casing 10A in such a way that each of the casings 10A and 11A covers one surface of a respective one of the opposed casings. The upper casing 10A and the lower casing 11A are hinge connected to each other so as to sandwich the hinge portion 18 therebetween. Specifically, the mobile phone 1A is configured so that the upper casing 10A can be rotated a predetermined angle relative to the lower casing 11A about the hinge portion 18 in the Y direction in FIG. 10A. At a predetermined position inside the mobile phone 1A, there is provided an antenna 33, via which the mobile phone 1A performs transmission/reception of radio waves to/from the base station (not shown).

On the internal surface of the upper casing 10A (i.e., on the surface facing the lower casing 11A), there is provided a liquid crystal display 12A. At a predetermined position inside the mobile phone 1A, there is provided a first speaker 14A, by which the user can hear sounds. As shown in FIG. 10B, when the mobile phone 1A is in the closed state, the liquid crystal display 12A and the first speaker 14A are covered with the upper casing 10A and are not exposed to the outside, but as shown in FIG. 10A, by changing the configuration state of the mobile phone 1A into the open state by rotating the upper casing 10A relative to the lower casing 11A about the hinge portion 18, the liquid crystal display 12A and the first speaker 14A become exposed to the outside.

The lower casing 11A includes operation keys 13, such as up/down/left/right keys for moving the position of a cursor in upper/down and left/right directions, and numeric keys of "0" to "9" for inputting numerals or character strings on the surface of the lower casing 11A, a call key for performing call processing, call-ending/power keys for ending communications or switching the on/off of the power supply, and a clear key for erasing inputted character strings or ending processing during execution. Using these operation keys 13, the user can input various instructions into the mobile phone 1A. As shown in FIG. 10B, when the mobile phone 1A is in the closed state, these operation keys 13 are covered with the upper casing 10A and are not exposed to the outside, but as shown in FIG. 10A, when the configuration state of the mobile phone 1 is changed into the open state by rotating the upper casing 10 relative to the lower casing 11 about the hinge portion 18, the operation keys 13 become exposed to the outside.

Besides, the lower casing 11A incorporates a microphone 15A, by which voices of the user during a phone call or a video-phone call are collected. As shown in FIG. 10B, when the mobile phone 1A is in the closed state, the microphone 15A is covered with the upper casing 10A and is not exposed to the outside, but as shown in FIG. 10A, when the configuration state of the mobile phone 1A is changed into an open state by rotating the upper casing 10A relative to the lower casing 11A about a hinge portion 18, the microphone 15A becomes exposed to the outside. On a side surface of the lower casing 11A, there are provided side keys 13b. By depressing one of the operation keys 13b, the user can promptly actuate a predetermined function that is previously related to the operation key 13b.

The lower casing 11 includes a second speaker 16A and a third speaker 17A. The second speaker 16 and the third speaker 17A are disposed at positions where sound waves are radiated toward the outside of the mobile phone 1A. For example, radiation holes are formed in the external surface of the lower casing 11A (i.e., in the surface in no contact with the upper casing 10A), whereby sound waves are radiated toward the outside of the mobile phone 1A. Here, the second speaker 16A and the third speaker 17A are provided at positions that are always exposed to the outside, irrespective of whether the mobile phone 1A is in the open state or in the closed state.

In the mobile phone 1A, by rotating the upper casing 10A and the lower casing 11 about the hinge portion 18 with respect to each other, the first speaker 14A and the microphone 15A become exposed at predetermined positions, thereby improving the operability when the user makes voice communications using the mobile phone 1A.

As in the case of the first embodiment, when the mobile phone 1A is in the open state, the microphone 15A is exposed to the outside. Here, the echo canceller 31 prevents sounds outputted by the first speaker 14A, the second speaker 16A, or the third speaker 17A from being inputted into the microphone 15A.

However, when the mobile phone 1A is in the closed state, the microphone 15A provided in the lower casing 11A is covered with the upper casing 10A, and so the microphone 15A is not exposed to the outside. Here, although the mobile phone 1A is configured so that the echo canceller 31 prevents sounds outputted by the first speaker 14A, the second speaker 16A, or the third speaker 17A from being inputted into the microphone 15A, there is possibility that sound waves that have leaked from spacings between devices in between the upper casing 10A and the lower casing 11A may reflect on the upper casing 10A or the lower casing 11A to thereby be inputted into the microphone 15A. In this case, the sound volume level of unwanted sounds from the speaker exceeds the level up to which the sound volume can be removed by the echo canceller 31. This causes a problem of reducing the sound quality or causing howling on a talking partner side.

Accordingly, as in the case of the mobile phone 1 according to the first embodiment, the mobile phone 1A, when a handsfree function or a video-phone function is used, performs output control processing with respect to the speakers. Because this output control processing is the same as what described based on the flowchart in FIG. 7 in the first embodiment, description thereof is omitted.

Also, as in the case of the mobile phone 1 according to the first embodiment, the mobile phone 1A has functions as shown in FIG. 3. That is, the mobile phone 1A, as shown in FIG. 3, is constructed by mutually electrically connecting, by buses, a main control unit 20, a power supply circuit unit 21, an operation input control unit 22, a display control unit 23, a storage unit 24, an audio codec 25, a modulation/demodulation circuit unit 26, an output control unit 27, and a casing opening/closing unit 28.

In accordance with the mobile phone 1A according to the second embodiment of the present invention, as in the case of the first embodiment, in the mobile phone constructed by the casings having the opening/closing mechanism, when a video-phone call or handsfree talking is made, by controlling the speaker output in accordance with an opening/closing state of the casing, it is possible to prevent an occurrence of howling, which has been a conventional problem, and to maintain a high communication quality.

In the first embodiment and the second embodiment, descriptions have been made of the mobile phone 1 in which the plurality of casings are slidably stacked together, and the mobile phone 1A in which the plurality of casings are rotatably stacked together. However, the mobile phone is not limited to the above-described constructions, but may have any other construction such as a swivel type, as long as it has casings with an opening/closing mechanism.

While the present invention has been described as related to the embodiments of the mobile phones 1 and 1A, it is to be understood that the present invention is not limited to such applications but may be applied to any other information processing apparatuses, such as personal handyphone systems (PHSs), personal digital assistants (PDAs), and the like.

What is claimed is:

1. A mobile phone comprising:
a microphone and a plurality of speakers including a first speaker and a second speaker, the mobile phone configured to transition between at least two states, a closed state in which the microphone is covered and the first speaker is a first distance from the microphone, and an open state in which the microphone is not covered and the first speaker is a second distance from the microphone that is greater than the first distance, the second speaker being, in both the closed state and the open state, a single third distance from the microphone and not covered;
a determination unit configured to determine the configuration state; and
an output control unit configured to, on the basis of the determination result of the determination unit, control the on/off action of the plurality of speakers and the microphone.

2. The mobile phone according to claim 1, wherein, when the mobile phone is determined to be in the open state by the determination unit, the output control unit turns on the plurality of speakers and turns on the microphone, and, when the mobile phone is determined to be in the closed state by the determination unit, the output control unit turns on some of the plurality of speakers while turning off the rest thereof, and turns on the microphone.

3. The mobile phone according to claim 2, wherein, when the mobile phone is determined to be in the closed state by the determination unit, the output control unit turns off the speaker located closest to the microphone out of the plurality of speakers.

4. The mobile phone according to claim 1, wherein, when the mobile phone is determined to be in the open state by the determination unit, the output control unit turns on the plurality of speakers at a predetermined sound volume level and turns on the microphone, and, when the mobile phone is determined to be in the closed state by the determination unit, the output control unit turns on some of the plurality of speakers with a sound volume level thereof raised while turning off the rest of the plurality of speakers, and turns on the microphone.

5. A mobile phone comprising:
a microphone and a plurality of speakers including a first speaker and a second speaker, the mobile phone configured to transition between at least two states, a closed state in which the microphone is covered and the first speaker is a first distance from the microphone, and an open state in which the microphone is not covered and the first speaker is a second distance from the microphone that is greater than the first distance, the second speaker being, in both the closed state and the open state, a single third distance from the microphone and not covered;
a determination unit configured to determine the configuration state; and
an output control unit configured to, when the mobile phone is determined to be in the open state by the determination unit, turn on the plurality of speakers at a predetermined sound volume level and turn on the microphone, and, when the mobile phone is determined to be in the closed state by the determination unit, turn on some of the plurality of speakers at a predetermined sound volume level while turning on the rest of the plurality of speakers at a lower sound volume level than the predetermined sound volume level, and turn on the microphone.

6. A mobile phone comprising:
a microphone and a plurality of speakers including a first speaker and a second speaker, the mobile phone configured to transition between at least two states, a closed state in which the microphone is covered and the first speaker is a first distance from the microphone, and an open state in which the microphone is not covered and the first speaker is a second distance from the microphone that is greater than the first distance, the second speaker being, in both the closed state and the open state, a single third distance from the microphone and not covered;
a determination unit configured to determine the configuration state; and
an output control unit configured to, when the mobile phone is determined to be in the open state by the determination unit, turn on the plurality of speakers at a predetermined sound volume level and turn on the microphone, and, when the mobile phone is determined to be in the closed state by the determination unit, turn on some of the plurality of speakers with a sound volume level thereof raised while turning on the rest of the plurality of speakers with a sound volume level thereof lowered, and turn on the microphone.

7. The mobile phone according to claim 6, wherein:
the mobile phone is constructed by slidably stacking a first casing and a second casing together;
the microphone is incorporated in the first casing; and
the mobile phone is opened/closed by sliding the second casing relative to the first casing.

8. The mobile phone according to claim 6, wherein:
the mobile phone is constructed by connecting a first casing and a second casing so as to be rotatable about a hinge portion;
the microphone is incorporated in the first casing; and
the mobile phone is opened/closed by rotating the second casing relative to the first casing.

9. The mobile phone according to claim 1, wherein:
the mobile phone is constructed by slidably stacking a first casing and a second casing together;
the microphone is incorporated in the first casing; and
the mobile phone is opened/closed by sliding the second casing relative to the first casing.

10. The mobile phone according to claim 1, wherein:
the mobile phone is constructed by connecting a first casing and a second casing so as to be rotatable about a hinge portion;
the microphone is incorporated in the first casing; and
the mobile phone is opened/closed by rotating the second casing relative to the first casing.

11. The mobile phone according to claim 5, wherein:
the mobile phone is constructed by slidably stacking a first casing and a second casing together;
the microphone is incorporated in the first casing; and
the mobile phone is opened/closed by sliding the second casing relative to the first casing.

12. The mobile phone according claim 5, wherein:
the mobile phone is constructed by connecting a first casing and a second casing so as to be rotatable about a hinge portion;
the microphone is incorporated in the first casing; and
the mobile phone is opened/closed by rotating the second casing relative to the first casing.

* * * * *